United States Patent [19]

Onaga et al.

[11] Patent Number: 4,896,087

[45] Date of Patent: Jan. 23, 1990

[54] ROBOTIC WORKCELL CONTROL SYSTEM HAVING IMPROVED INPUT/OUTPUT INTERFACING FOR BETTER WORKCELL OPERATION

[75] Inventors: Eimei M. Onaga, Blawnox, Pa.; Richard J. Casler, Jr., Newtown, Conn.; James A. Hart, Virginia Beach, Va.; Kim N. Trinh, Danbury, Conn.; Kenneth E. Daggett, Murrysville, Pa.

[73] Assignee: Staubli International AG., Switzerland

[21] Appl. No.: 304,972

[22] Filed: Jan. 31, 1989

[51] Int. Cl.⁴ ............................................ G05B 19/42
[52] U.S. Cl. .................................. 318/568.2; 364/513; 901/42; 312/223
[58] Field of Search ..................... 318/568.2; 364/513; 901/42 X; 312/273 X

[56] References Cited

U.S. PATENT DOCUMENTS

| | | | |
|---|---|---|---|
| 4,661,680 | 4/1987 | Swens | 901/42 X |
| 4,787,297 | 11/1988 | Johnson | 901/42 X |
| 4,835,730 | 5/1989 | Shimano et al. | 364/513 |

*Primary Examiner*—William M. Shoop, Jr.
*Assistant Examiner*—Saul M. Bergmann
*Attorney, Agent, or Firm*—Mason, Kolehmainen, Rathburn & Wyss

[57] ABSTRACT

A control system is provided for a workcell having a plurality of electric robots and a plurality of workcell equipment items in turn having a plurality of control and sensor devices associated therewith.

Respective electronic robot controllers are disposed at respective workcell locations to operate robots as a part of the workcell process. Each robot controller has a floppy disk or other means for loading program data for one of the robot controllers.

A first input/output control module is disposed at another workcell location and it has connected thereto as inputs a first group of the sensor devices and as outputs a first group of the control devices. Second and third input/output control modules are disposed at additional workcell locations and have connected thereto as inputs second and third groups of the sensor devices and as outputs second and third groups of the control devices.

Additional input/output control modules are associated with the other robot controllers, and are similarly connected and placed in spaced workcell locations.

A serial local area network connects each robot controller and its associated input/output modules to provide for program and process data communication. Each of the input/output modules has means including a microprocessor for operating the module in accordance with a system operating program downloadable from the associated robot controller to the module and for processing inputs and outputs in accordance a user process program downloadable from the associated robot controller to the module.

6 Claims, 10 Drawing Sheets

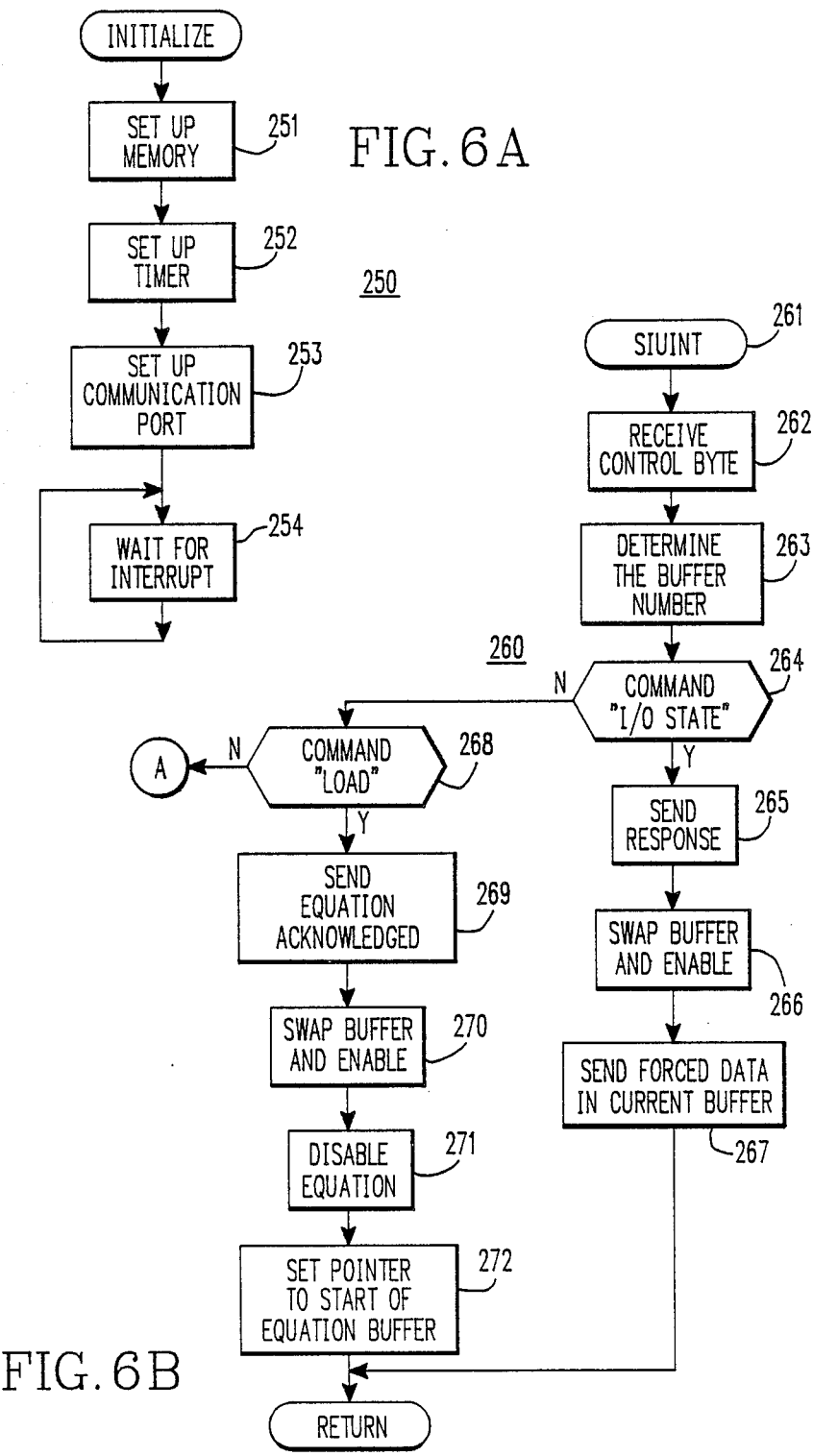

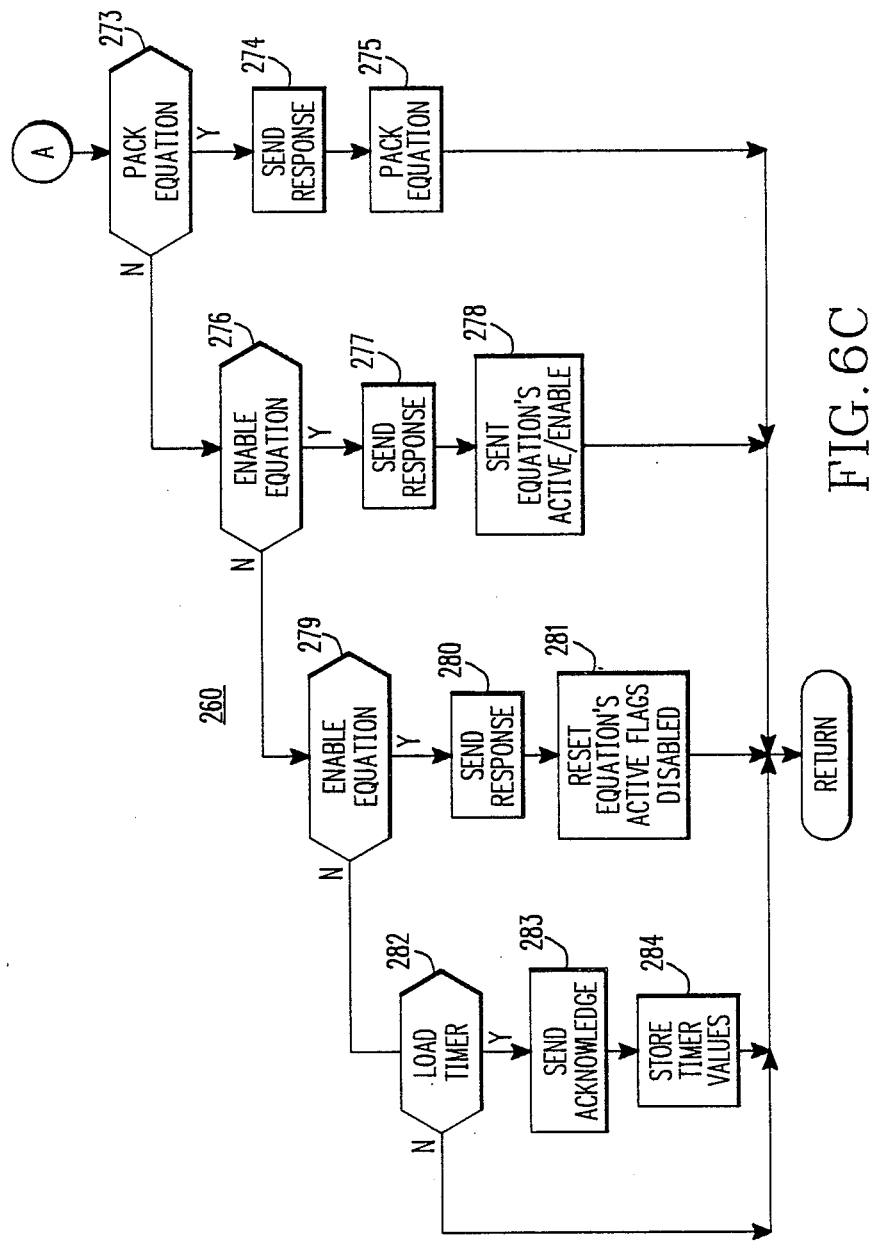

ROBOTIC WORKCELL CONTROL SYSTEM HAVING IMPROVED INPUT/OUTPUT INTERFACING FOR BETTER WORKCELL OPERATION

CROSS-REFERENCE TO RELATED PATENT APPLICATIONS

The following patent applications are incorporated herein by reference:

Ser. No. 932,989 (W.E. 53,373) entitled IMPROVED DIGITAL CONTROL FOR MULTIAXIS ROBOTS, filed by Kenneth E. Daggett, Richard J. Casler, Eimei Onaga, Barrett Booth, Rajan Penkar, Leonard C. Vercellotti, and Richard A. Johnson on Nov. 20, 1986, and assigned to Westinghouse Electric Corporation, and all patent applications cross-referenced therein.

Ser. No. 304971 (W.E. Case 55,138) entitled ROBOTIC WORKCELL CONTROL SYSTEM WITH A BINARY ACCELERATOR PROVIDING ENHANCED BINARY CALCULATIONS, filed by Kenneth E. Daggett on Jan. 31, 1989, and assigned to Westinghouse Electric Corporation, and all patent applications cross-referenced therein.

BACKGROUND OF THE INVENTION

The present invention relates to control systems for operating robots and workcell devices in robotic workcells and more particularly to the implementation of input/output signal interfacing in such control systems.

In a typical factory workcell, one or more robots are operated with various workcell devices to perform predetermined work operations on materials and/or products being processed in the workcell. Generally, the robots and workcell devices are cooperatively operated so that the materials or products are moved from device to device or from device to robot or vice versa and so that specified device or robot work operations are performed on the materials or products. The work area and its layout depend on what is being processed or made in the work cell, what devices and robots are provided and how such devices and robots are operated and interacted.

To operate a workcell as described, it is necessary that various workcell signals be generated for input to the control system and that the control system generate output signals for the purposes of monitoring and controlling the operation of the workcell robot(s) and devices. Varying levels of complexity may be involved in the local control of the various workcell devices.

One conventional approach for configuring a workcell control system with input/output signal interfacing simply involves the use of a robot controller to which robot and other workcell device signals are applied as inputs for programmed logic processing from which output monitoring and control signals are generated for the workcell. With this approach, the control loading created by the need for sequential logic control and local control of the workcell devices places restraints on the capacity of the robot controller to provide real time robot arm control. Further, this robot controller centered configuration is highly inflexible to modification after installation or for installation in different applications, especially since it requires the connection of hard wires between the robot controller and the various input/output signal locations. The robot controller centered configuration becomes increasingly disadvantageous as work area size and/or control complexity increases.

Another approach to workcell control configuration, and perhaps the most prevalent one, involves the use of one or more programmable logic controllers (PLCs). In the robot controller/PLC configuration, the PLC is placed at a predetermined workcell location and workcell input/output connections and robot connections are made to the PLC. Local workcell device control and workcell sequential logic control can be performed by the PLC independently of the robot controller yet robot and workcell device control can be performed interdependently because of the coupling of the PLC and the robot controller. As a result, the full capacity of the robot controller is essentially made available for robot arm control.

Nonetheless, the robot controller/PLC configuration has disadvantages including:

1. The hard wiring requirements from the PLC to the various signal locations can be extensive, i.e. increasing with work area size and control system complexity.

2. PLCs are relatively expensive especially for applications having relatively low control complexity.

3. The PLC is separately programmed, and a programming language different from the robot controller programming language normally must be used for PLC programming. Therefore, two or more skilled people are normally required for system programming and for workcell operation.

There accordingly has been a need for development of a robotic workcell control system in which better, more efficient and less costly input/output interfacing is provided so that improved workcell operations can be achieved. The present invention is directed to this end.

SUMMARY OF THE INVENTION

A control system is provided for a workcell having at least one electric robot and a plurality of workcell equipment items in turn having a plurality of control and sensor devices associated therewith. An electronic robot controller is disposed at a first workcell location to operate the robot as a part of the workcell process. Means are provided for loading program data into the robot controller.

A first input/output control module is disposed at a second workcell location and has connected thereto as inputs a first group of the sensor devices and as outputs a first group of the control devices. At least a second input/output control module is disposed at a third workcell location and has connected thereto as inputs at least a second group of the sensor devices and as outputs at least a second group of the control devices.

A serial local area network connects the robot controller and the input/output modules to provide for program and process data communication. Each of the input/output modules has means including a microprocessor for operating the module in accordance with a system operating program downloadable from the robot controller to the module and for processing inputs and outputs in accordance a user process program downloadable from the robot controller to the module.

BRIEF DESCRIPTION OF THE DRAWINGS

FIGS. 6A–6E show flow charts representing programming executed in a microprocessor on each input/output module;

DESCRIPTION OF THE PREFERRED EMBODIMENT

PALLETIZING PLANT LAYOUT

Figure 1:
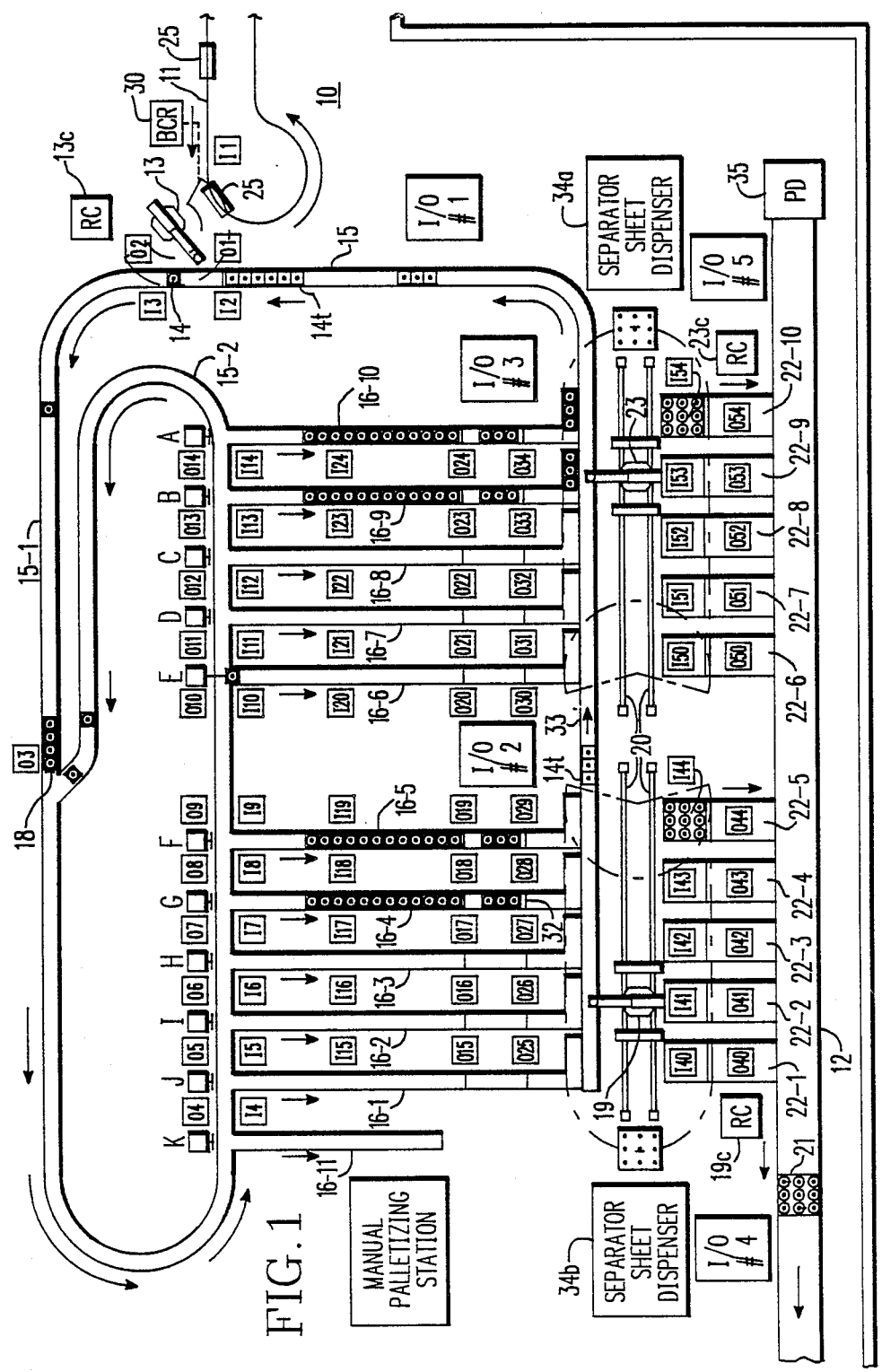
FIG. 1 shows a layout for a production facility in the form of a palletizing plant in which the invention is advantageously applied.

In FIG. 1, there is shown the layout of a palletizing plant or workcell 10 in which the invention is advantageously embodied. The manufacturing process involves receiving spools 14 of yarn from a rail conveyor 11 and moving and sorting the spools 14 for placement on pallets 21 that the delivered on a pallet conveyor 12.

The palletizing plant 10 includes a receiving robot 13 and its controller 13C for transferring the yarn spools 14 to a main roller conveyor 15 where spool sorting occurs. Sorting is achieved through the use of a plurality of queueing conveyors 16-1 through 16-10 and a manual queueing conveyor 16-11 that intersect with the main conveyor 15 at respective queueing stations. Diverters A through K push each spool 14 from the main conveyor 15 to the queueing conveyor to which it is assigned.

If a yarn spool 14 is not diverted to a queueing conveyor for some reason, it is returned to main branch 15-1 of the conveyor 15 over return conveyor branch 15-2. An automatically controlled escapement device 18 holds spools 14 on the main conveyor 15 during the time period when a spool 14 is reentering the main conveyor branch 15-1 from the return conveyor branch 15-2.

A robot 19 is supported on rails 20 and operates to transfer yarn spools 14 from the queueing conveyors 16-1 through 16-5 to pallets 21 on respective indexing conveyors 22-1 through 22-5 corresponding to the queueing conveyors 16-1 through 16-5. Another rail supported robot 23 transfer spools 14 from the queueing conveyors 16-6 through 16-10 to indexing conveyors 22-6 through 22-10. Respective robot controllers 19C and 23C are provided for the robots 19 and 23.

Figure 8:
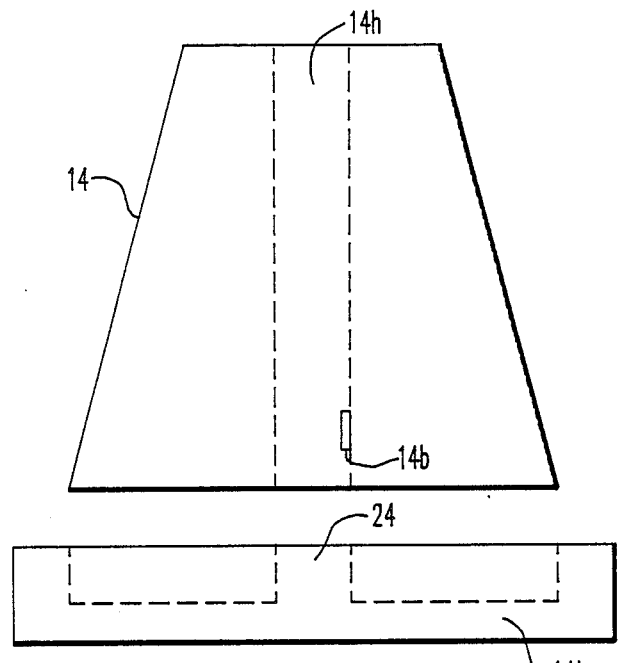
FIG. 8 shows an elevational view of a yarn spool of the type that is palletized in the plant and, in addition, a tray that is used to carry the spool during the plant processing.

As shown in FIG. 8, the spools 14 generally have a conical shape with a hollow cylindrical core 14H. A bar code 14B is secured to the inner core surface of each spool 14 to provide identity data including the product category.

A molded tray 14T (FIG. 8) is used as a carrier for each spool 14 on the main conveyor 15. The tray 14T includes a centrally located bump 24 for indexed positioning of the spool 14 on the tray 14T.

Figure 9:
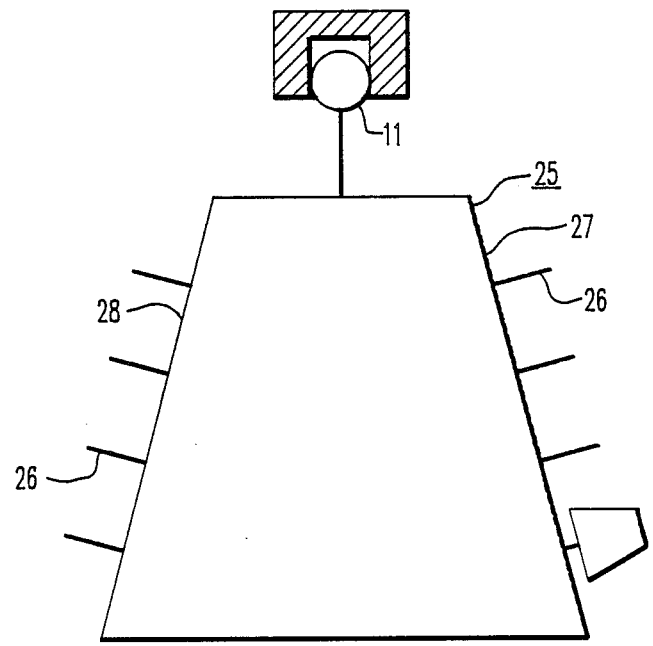
FIG. 9 shows a schematic view of a rack used to carry spools to the input side of the palletizing plant.

The spools 14 are delivered to the workcell 10 on a package carrier 25 shown schematically in FIG. 9. The carrier 25 is suspended from the rail conveyor 11 and has a total of four spindles 26 on each of two sides 27 and 28 thereby providing a capacity for carrying eight of the spools 14. A positioning and rotating device (not specifically shown in FIG. 1) holds the carrier 25 in position and rotates the carrier 25 to enable the robot 13 to unload the spools 14 from both sides of the carrier 25. When an empty tray 14T is sensed to be in loading position on the main conveyor 15, the robot 13 takes a spool from the carrier 29 and places it on the empty tray 14T. The newly loaded tray 14T is then released to be roll driven along the main conveyor 15 toward the escapement 18.

A bar code reader 30 reads the bar code on each spool 14 to identify its queueing station for palletizing. When each spool 14 reaches its identified queueing station, it is diverted onto its queueing conveyor 16 as previously described. If the bar code cannot be read or if it is in error for any particular spool, the manual queueing station 17-11 is assigned to that spool for special processing.

Each queueing conveyor includes a holding escapement device which queues the spools 14 for entry by threes to a loading area for which there is provided another escapement device 32. When the spools are unloaded from all three of the trays 14T in a conveyor loading area, the device 32 is operated to release the empty trays for return over a return conveyor branch 33 to the start of the process.

The robot 19 or 23 moves along the rails 20 to the queueing line that is ready for unloading. The robot removes the spools 14 from the trays 14T and places them on a pallet 21 until a layer of spools 14 is completed on the pallet. The robot then obtains a separator sheet from a dispenser 34A or 34B and places it on the spool layer so that a second layer of spools can then be placed on the same pallet. Each pallet is usually loaded with three or four layers of yarn spools.

When a pallet 21 is completely loaded, it is released to its indexing conveyor system for transfer to the pallet delivery conveyor 12. Empty pallets 21 are supplied to the indexing conveyors from a dispenser 35 over the delivery conveyor 12.

Various electrical input devices I1 through I54 are employed in the workcell 10 to provide status signals for logic control. Further, various electrical control devices 01 through 054 are operated by controller outputs to run the workcell in the manner described.

To facilitate plant wiring and enhance robot controller capacity and provide other advantages in accordance with the invention, smart input/output modules 75 are spaced around the work area and linked to the robot controllers. In this case, three input/output modules are associated with the robot 13 and only one module is assigned to each of the robots 19 or 23.

The following is a list of the principal input/output devices, their functions and the input/output module with which each is coupled:

Robotic Workcell Control System

Figure 2:
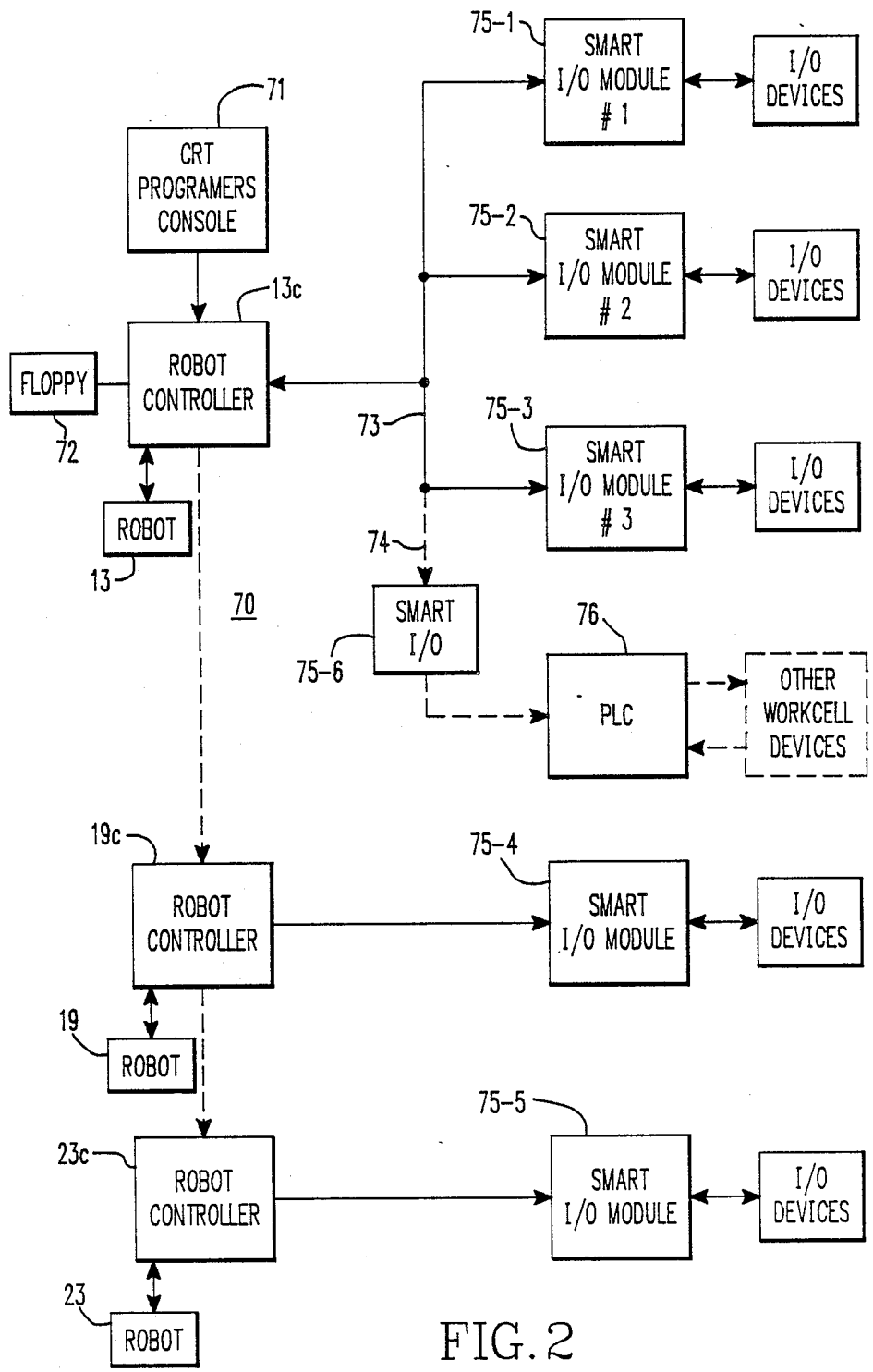
FIG. 2 shows a block diagram of a control system for the production facility of FIG. 1 in which a robot controller and other elements are arranged in accordance with the principles of the invention.

A workcell control system 70 (FIG. 2) includes the robot controllers 13C, 19C, and 23C to operate the robotic plant or workcell 10 in accordance with the invention. As shown, the electronic robot controller 13C operates the robot 13 in accordance with a user's program loaded into the controller 13C, for example through a floppy disk 72 under operator control from a programmer's console 71. The floppy disk 72 is also used advantageously to download programs to the input/output modules 75 as subsequently more fully described herein. A like operating scheme (not shown) is provided for each robot controller 19C or 23C.

The workcell control system 70 further includes a plurality of the input/output modules 75, with the number thereof depending on the input/output needs and the layout of the particular workcell being operated. As previously indicated, a total of 5 input/output modules 75-1 through 75-5 are employed in this case to provide a distributed intelligence interface with the input/output devices included in the workcell 10. Since the robot 13 is the only one having a plurality of input/output modules 75 in this application, only the robot controller 13C will be described to illustrate the invention.

A serial local area network bus 73 provides data communications among and between the input/output modules 75-1 through 75-3 and the robot controller 13C. Accordingly, bus connections are employed for signalling across a large area of the plant 10 and only short wire runs are needed for individual input/output device connections. Substantial reduction in wiring is thus realized while freeing up control capacity and retaining centralized control in the robotic controller 13C.

As indicated by dotted line 74, one or more additional input/output modules 75-6 can be included in the system for connection to one or more respective conventional programmable logic controllers (PLCs) 76. In that event, other workcell input/output devices are wired to the PLC in the conventional manner.

Robot Control Loop Configuration

Figure 3:
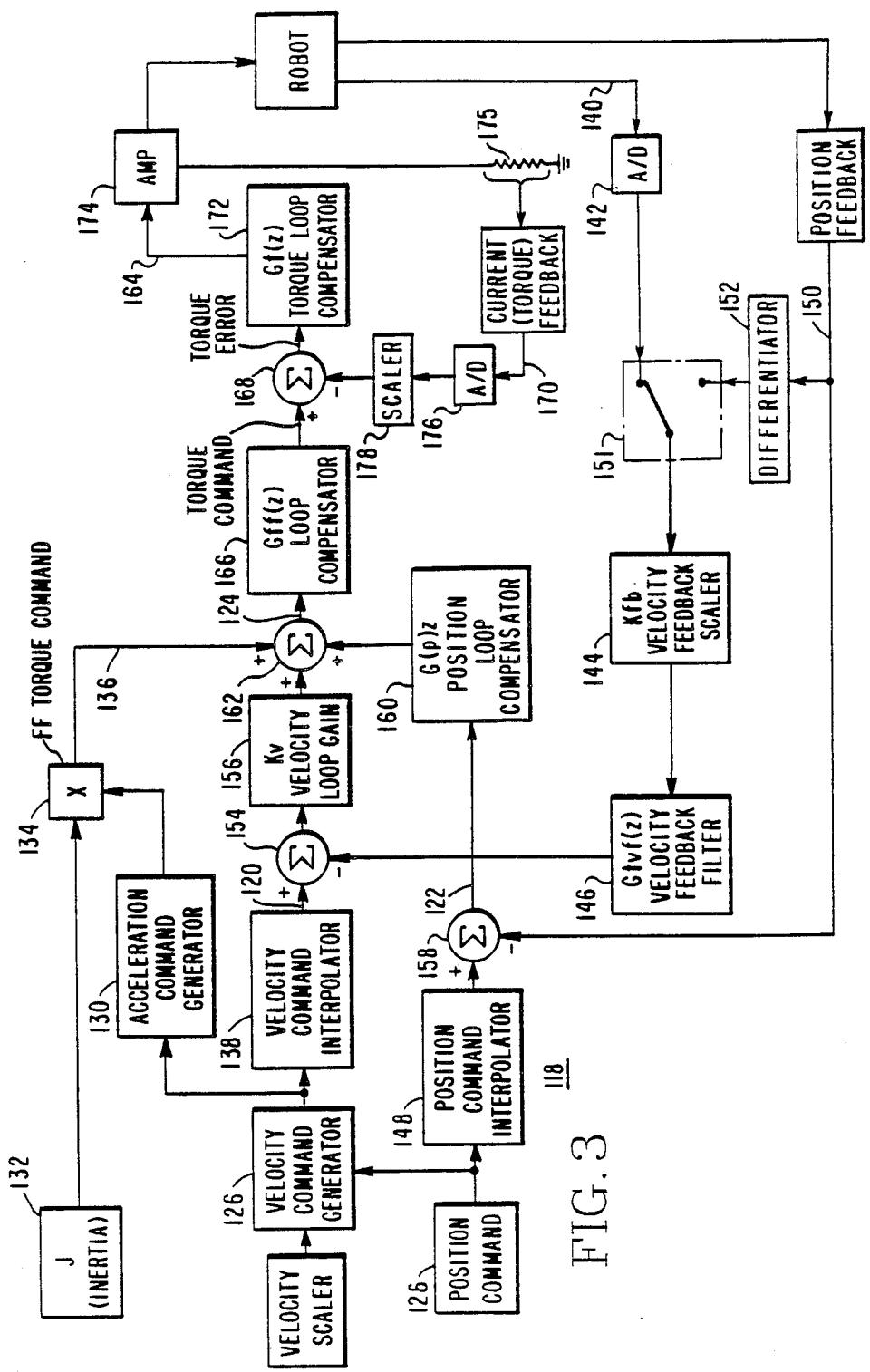
FIG. 3 shows a control loop block diagram for the robot controller shown in FIG. 2.

In FIG. 3 there is shown a generalized control loop configuration 118 preferably employed to operate each of the robots 13, 19 and 23. It is preferably implemented as a completely digital control. With the provision of hierarchical architecture and multiprocessor architecture and floating point hardware as described in patent applications referenced above, the trajectory cycle can be characterized with a cycle time in the range of 32 to 8 milliseconds depending on the employed modular configuration.

In the preferred control loop arrangement 118, position and velocity control loops 120 and 122 are parallel fed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command is generated in this case once every 8 to 32 milliseconds depending on the modular configuration of the robot control. The basic robot control described in the referenced applications has a trajectory cycle time of 32 milliseconds while the enhanced control has a trajectory cycle time of 8 milliseconds.

In any case, a velocity command generator 138 interpolates velocity commands at the rate of 1 each millisecond which corresponds with the velocity feedback sampling rate in velocity feedback path 140. As shown, velocity feedback may be produced by tachometer signals which are converted from analog to digital by converter 142. A scaler 144 and a filter 146 round out the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in referenced Application W.E. 53,325.

Velocity error is generated by summer 154 with gain applied by loop 156. Similarly, position error is generated by summar 1598 with gain applied by box 160.

Velocity and position errors and a feedforward acceleration command are summed in summer 162. Gain is applied to box 166 to generate a torque command which is applid to the input of torque control loop 164 every millisecond. Torque error is generated in summer 168 by summing the torque command (motor current command) with current feedback from feedback path 170. Box 172 applies a torque loop gain to the torque error and output commands (motor voltage commands) are applied to a power amplifier 174 which supplies the motor drive current for robot joint operation.

Current feedback from resistor 175 is generated every 250 microseconds (see referenced Patent Application W.E. 53,324) and converted to digital signals by box 176 with scaling applied by box 178. If desired, adaptive feedforward torque control can be employed with omission of the feedforward acceleration command as more fully described in another copending application, Serial No. 171,500 (W.E. pb 53,972) entitled ROBOT CONTROL SYSTEM HAVING ADAPTIVE FEEDFORWARD TORQUE CONTROL FOR IMPROVED ACCURACY, filed by E. Onaga et al. on Mar. 18, 1988.

ELECTRONIC BOARD OVERVIEW

Implementation of the control looping for the robot controller 72 is achieved by the use of digital control circuitry disposed on a plurality of electronic boards. The organization of the circuitry on the boards and the partitioning of programming among various microprocessors enables advanced robot control performance to be achieved as described in the referenced patent applications.

Figure 4:
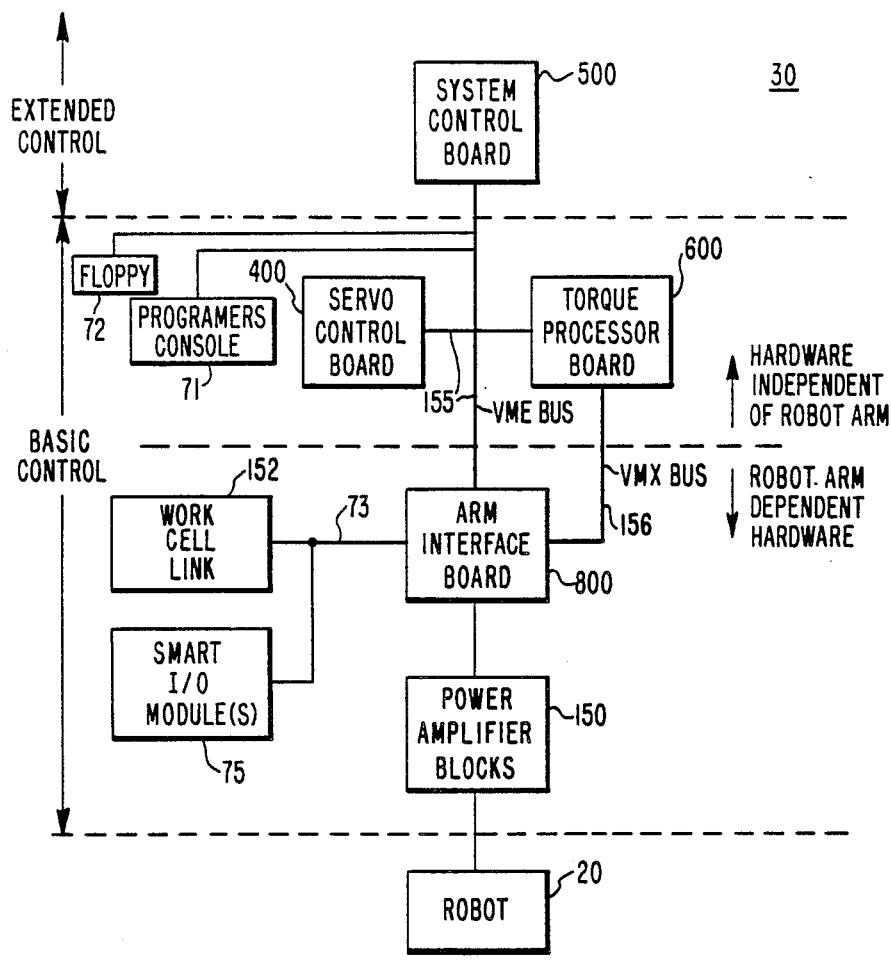
FIG. 4 shows an electronic board arrangement for the robot controller and its interface with input/output devices in accordance with principles of the invention.
Figure 5:
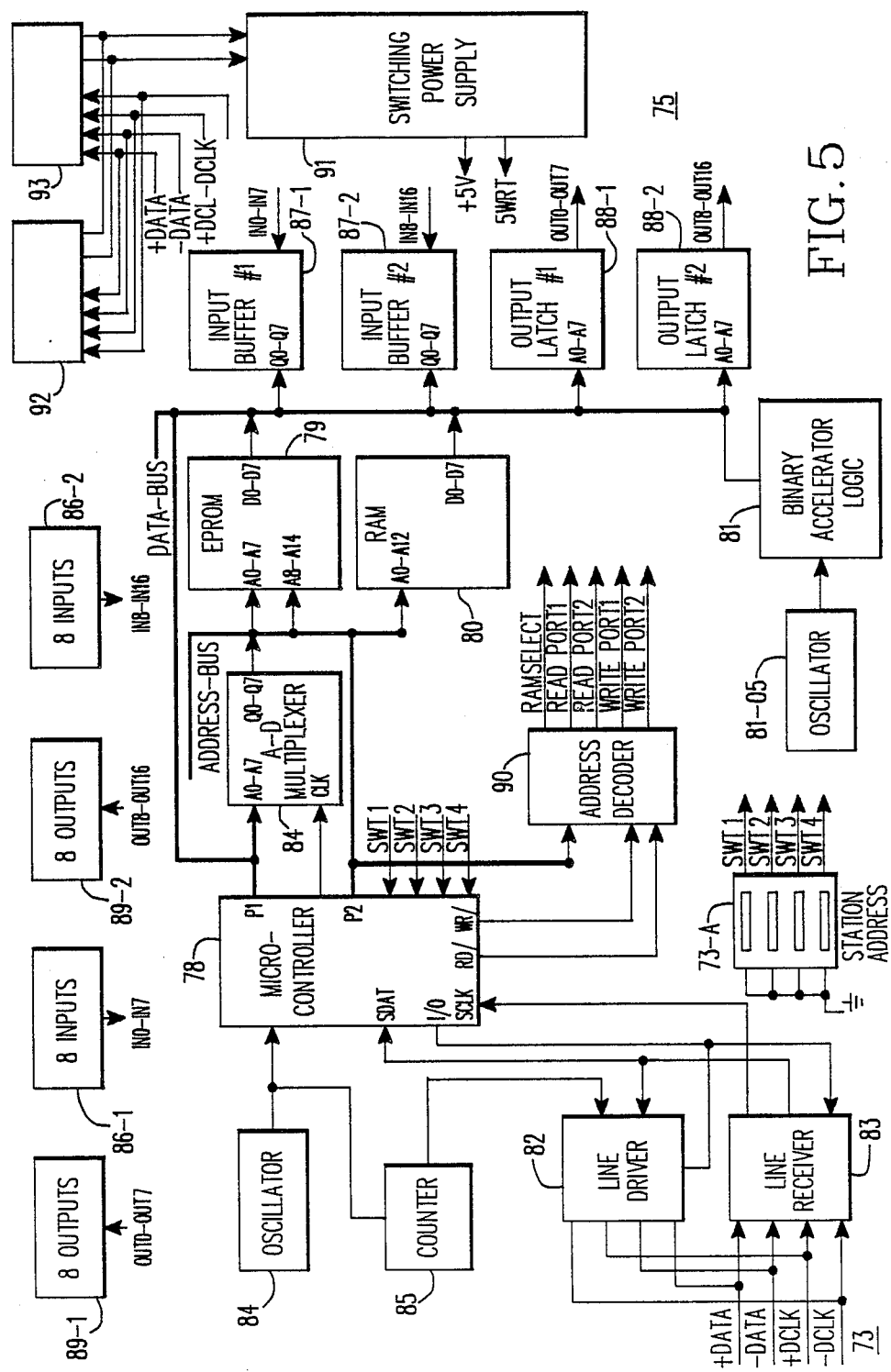
FIG. 5 shows in greater block detail the circuitry for an input/output module included in the board arrangement of FIG. 4.

As shown in FIG. 4, the control board configuration or network includes an arm interface board 800 which preferably houses all circuitry dependent on the type of robot arm being controlled. For example, position feedback circuitry will differ according to whether absolute or incremental position feedback is used by the robot arm to be controlled. Any particular robot arm would require use of the arm interface board which is structured to work with that robot arm.

The arm interface (AIF) 800 board also houses generic circuitry such as VME bus control circuitry which is generally related to two or more boards and not to any one board in particular.

Control signals (pulse width modulated) are generated from the AIF board 800 to control power block 150 which supply motor current to the respective robot joint motors.

The AIF board 800 also includes a data bus to operate as a program and operation data channel for external coupling of the robot controller 72 to other robot controllers, if included in a work cell, as indicated by the reference character 152, and to the smart input/output modules 75, over the local area network 73. The VME bus couples the AIF board to an SCM board 400 for I/O operational and supervisory control, among other purposes.

A torque processor (TP) board 600 and the servo control board (SCM) 400 are generic circuit boards used with the AIF board 800 and power amplifier blocks 150 in all robot control systems for all robot types. The three circuit boards 400, 600 and 800 provide complete 6-axis control for a robot arm and thus form a basic control configuration for the UNIVAL family of robot controls.

The torque procesor board 600 provides motor torque control in response to commands from the servo control board 400. In turn, the SCM board 400 provides arm solutions and positions and velocity control in accordance with a robot control program. As already suggested, the SCM board 400 also provides for interfacing the programmer's console 71 with the input/output modules 75 and for downloading programs thereto.

Extended control capability and/or system functioning is achieved by interconnecting additional electronic boards or devices to the basic control 400, 600, 800. For example, with the addition of a system control board 500 and partitioning of predetermined program functions including the arm solutions from the SCM board 400 to the system control board 500, the control can operate the robot with significantly faster control actin, i.e., with a trajectory cycle shortened from thirty-two microseconds to eight microseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 4) are provided on the AIF, TP and SCM boards and any other connectable units to facilitate VME and VMX interboard bus connections modular and board assembly for the robot cotrol 30. Other connectors are provided on the AIF board 800 for external input/output connections.

More detail on the board circuit structure is presented in the writeups for the cross-referenced patent applications.

Smart Input/Output Control Module

The preferred electronic board circuitry for the smart input/output module 75 is represented by the block diagram shown in FIG. 4.

Local intelligence is provided for the module 75 by a microcontroller 78 (such as an 8044 device) and a co-processing binary accelerator 81 (embodied with a circuitry disclosed in the referenced, concurrently filed patent application). The binary accelerator 81 provides solutions at hardware speed for logic equations assigned to it and thereby significantly speeds up the overall operation of the module 75.

The microcontroller 75 has (1) an EPROM memory 79 for storage of a downloaded module operation program and (2) a RAM memory 80 for storage of user programs related to sequence logic and other control of the input/out devices associated with the module.

The module operation program is dowloaded from the robot controller 13 as previously indicated, and it executes its assigned level of control over data communications to and from the module 75 through the local area network 73 and further controls the execution of the user's programming which processes device inputs, under control of a multiplexer 94, and generates device outputs that enable the particular module 75 to provide its assigned process control. Box 73A identifies the station address of the module 75 for the network 73.

A line driver 82 and a line receiver 83 and a station address detector 84 operate as part of the data communication system. An oscillator 84 and a counter 85 provide a timer which in this case provides four different delay times that can be used to control output pulse length.

Device inputs are channeled from input terminal blocks 86-1 and 86-2 through buffers 87-1 and 87-2. Similarly, device outputs are applied to latch blocks 88-1 and 88-2 for output through terminal blocks 89-1 and 89-2. An address decoder 90 provides device selection for input/output operations.

Power is supplied to the board by blocks 91, 92, and 93.

Programmed Operation of Input/Output Module

The program stored in the EPROM memory 79 is downloaded from the floppy disk through the robot controller 13 and specifically through its AIF board 800 and through the line receiver 83 on the input/output module board 75. User programs that basically define the operation of the manufacturing process under control are similarly downloaded to the RAM memory 80. As a result, workcell operation is significantly facilitated especially since robot programming and input/output programming for process control can both be done with use of the same programming language and usually from the same work station.

As shown in FIG. 6A, an initialization routine 250 is executed after power-up. Blocks 251, 252 and 253 respectively operate the microcontroller or microprocessor 78 to set up the input/output board memory structure, the timer 85 and the communication port through the drive/receiver circuitry 82 ad 83. Finally, block 254 places the microcontroller 78 in it's interrupt mode, i.e. idling subject to interrupt control.

The microcontroller 78 is triggered into programmed operation by either of two basic interrupts. The first is a cyclic 4 millisecond interrupt from the timer 85 for status updating of the process inputs and outputs to and from the input/output module board. The second is a cyclic 32 millisecond interrupt from the serial communications line 73.

Programmed execution of board communications is illustrated by a flow chart 260 shown in FIGS. 6B and 6C. After an interrupt 261, blocks 262 and 263 receive the transmitted control byte and identify the destination buffer number.

If block 264 indicates the command is an I/O status request, an acknowledgement is sent by block 265 and buffer and enable data are swapped by block 266. Forced data in the current buffer is then sent to the output port by block 267 and the program returns to the interrupt idle mode.

When the command is determined by block 268 to be a user program load command rather than an I/O status request, provision is made for newly downloaded user equation data to be stored for execution by the binary accelerator 81. First, an acknowledgement is sent by block 269. Next, block 270 swaps buffer and enable data. Finally, the existing equation is disabled by block 271 and the equation buffer pointer is set by block 272 to the start of the new equation. The program then returns to the interrupt idling mode.

Other possible communicated commands are shown in FIG. 6C. For a pack equation command detected by block 273, block 274 sends an acknowledgement and block 275 executes equation packing and is followed by a return. If block 276 detects an enable equation command, block 278 enables or activates the identified and previously stored equation after block 277 sends an acknowledgement. Similarly, if block 279 detects a disable equation command, block 281 resets the active flag for the identified and previously stored equation thereby disabling it.

When a timer load command is detected by block 282, block 283 sends an acknowledgement and the new timer values are stored by block 284 for implementation in the input/output board operation.

Figure 6D:
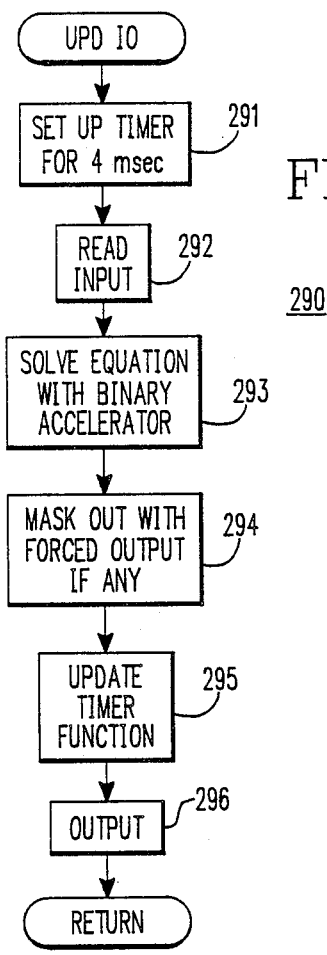
Figure 6E:
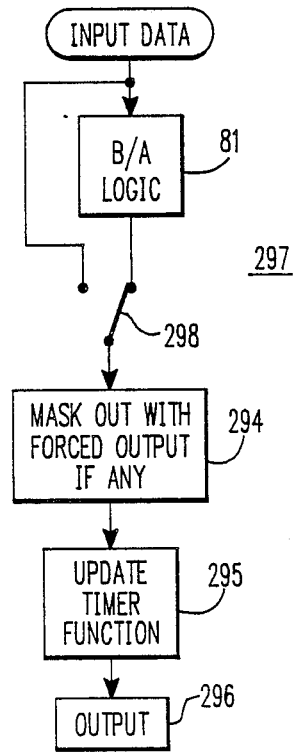

The process I/O status updating interrupt operation is represented by a flow chart 290 shown in FIG. 6D and a functional block diagram 297 shown in FIG. 6E. When a 4 millisecond timer interrupt occurs, block 291 first sets the time for the next cycle and block 292 then reads the process input data. Block 293 then calls for the binary accelerator 81 to solve the active equation(s). The results are masked by block 294 with any forced output data that has been received as a higher level control command.

Next, the timer function is updated by block 295 and process outputs are generated by block 296. The schematic diagram shown in FIG. 6E shows how binary accelerator equations are either applied for not applied to process input data. Thus, an enable/disable switch 298 controls the application of binary accelerator logic 81 to input data according to the operation of program blocks 278 and 281. Blocks 294, 295 and 296 then operate as previously described.

COMPARATIVE VALUE OF THE INVENTION

Figure 7:
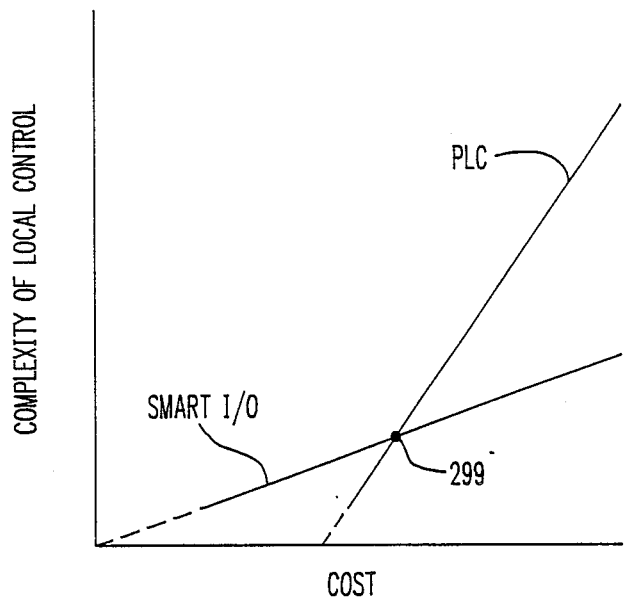
FIG. 7 shows a comparative value chart for use of the invention relative to prior art programmable logic controllers.

In FIG. 7, there is shown a chart illustrating the comparative value of the invention relative the prior art use of programmed logic controllers for the processing of process inputs and outputs. Thus, the complexity of control is plotted against cost for the prior art programmed logic controller (PLC) approach and for the distributed intelligence approach characteristic to the present invention. Up to the point of complexity indicated by intersect 299, the cost of applying the present invention is better than that of the PLC approach. For higher complexities, the PLC approachis cmparatively better from a cost standpoint.

What is claimed is:
1. A control system for a workcell having at least one electric robot and a plurality of workcell equipment items in turn having a plurality of control and sensor devices associated therewith, said system comprising:
   a first electronic robot controller disposed at a first workcell location to operate said robot as a part of the workcell process;
   means for loading program data into said robot controller;
   a first input/output control module disposed at a second workcell location and having connected thereto as inputs a first group of said sensor devices and as outputs a first group of said control devices;
   at least a second input/output control module disposed at a third workcell location and having connected thereto as inputs at least a second group of said sensor devices and as outputs at least a second group of said control devices;
   a serial local area network connecting said robot controller and said input/output modules to provide for program and process data communication; and
   each of said input/output modules having computing means including a microprocessor for operating the module in accordance with a module operating program downloadable from said robot controller to the module and for processing inputs and outputs in accordance with a user process program downloadable from said robot controller to the module.

2. A workcell control system as set forth in claim 1 wherein each of said input/output modules has a first memory for said module operating program and a second memory for said user process program.

3. A workcell control system as set forth in claim 1 wherein said module operating program is initiated in accordance with a communications interrupt cyclically generated at a first rate and a process input/output interrupt cyclically generated at a second rate.

4. A workcell control system as set forth in claim 3 wherein said user process program includes a plurality of logic equations executable in said computing means to generate process outputs for sequential and other controlled operation of the workcell equipment items.

5. A workcell control system as set forth in claim 3 wherein said module operating program includes instructions for detecting which of a plurality of different types of commands has been received from the robot controller and for generating a response thereto.

6. A workcell control system as set forth in claim 1 wherein a plurality of additional robots and respectively associated additional electronic robot controllers are provided for the workcell, each of said additional robot controllers having connected thereto at least one input/output module like said first and second input/output modules and if desired additional such like modules to provide input/output control through said additional robot controllers in the manner described for said first robot controller.

* * * * *